COLOR-PICTURE

Filed March 18, 1950

Peter Schwarz

INVENTOR.

Patented Sept. 23, 1952 2,611,817

UNITED STATES PATENT OFFICE 2,611,817

COLOR-PICTURE

Peter Schwarz, Los Angeles, Calif.

Application March 18, 1950, Serial No. 150,449

3 Claims. (Cl. 178—5.4)

The subject of this invention is to make the human eye see pictures in color on a screen. It is shown here in connection with home-television; however, it can be practiced in connection with other arts, where a picture appears on a screen; for instance—still and motion pictures.

The most common form of producing pictures in color on a screen is to place a color-filter in front of a camera lens, taking the picture in black and white, and then placing either in front of the projector or in front of the screen a similar color-filter and repeating this process for each desired color in rapid succession. The colors mostly used are the so-called primary colors, red, green and blue. This method necessitates a revolving color-filter which, if it is placed in front of the screen, has to cover it, and is therefore quite large; it also involves moving parts, which become noisy and easily get out of adjustment. There is therefore, a strong need for a system not employing moving parts. There is also no control of the colors and their brightness, inasmuch as the filter cannot be controlled by the viewer.

It is one object of this invention to create a system not employing moving parts or if, in an alternate mode, in such a way as to be not objectionable. Another advantage is, that the colors and their brightness can be easily controlled by the viewer, The principle of this method is to split the color-picture into two parts; one containing the intensity-component in a given color and the other the color itself. The picture is taken by means of color-filters in the regular way and received in black and white, containing the intensity component. The color-component is contained in an auxiliary screen illuminated in the appropriate color. The blending of these two pictures will produce the picture in the given color. Repeating this process for the primary colors will reconstitute the original in its natural colors.

The method will be easier understood with the aid of the drawings where

Figure 1:
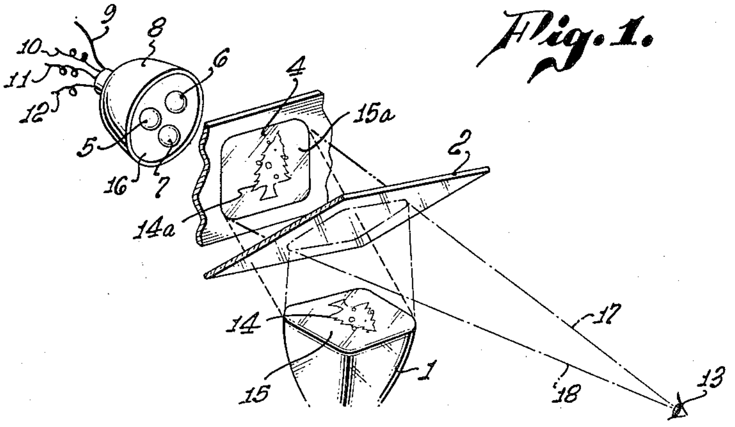
Fig. 1 represents a perspective view of the apparatus used in the method.
Figure 2:
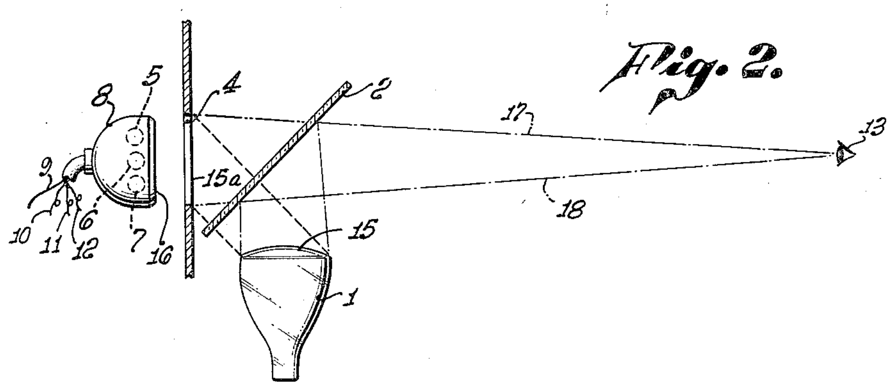
Fig. 2 shows the method with a viewer looking in the direction of the auxiliary screen.
Figure 3:
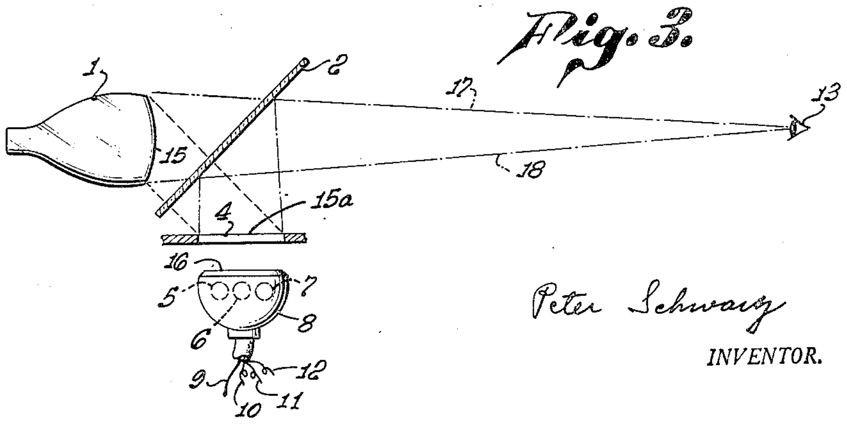
Fig. 3 shows the method with a viewer looking into the television tube or other screen.

The picture 14 is received in a conventional mode on the face 15, of the television tube 1. The auxiliary screen 4 is made of a uniform, translucent material and is illuminated in turn by lights 5, 6 and 7. These lights are of different colors complementary to the color-filters before the camera; usually red, blue-green and yellow. They may be of the fast-acting inertialess gas-filled type, like neon light for red, which have the color component already. These lights are housed in a casing 8, having a condensing lens 16 to make the illumination on screen 4 uniform. The lights have one common terminal 9 and separate terminals 10, 11 and 12, one for each light. These terminals are connected to the receiver, not shown, to be energized at the correct time in relation to the appearance of pictures 14 on screen 15. These connections may be accomplished in any suitable way known in the art of electronics and are not shown here. The auxiliary screen 4 need not be translucent but may be opaque in which case the lights 5 and 6 and 7 would be placed in its front. Interposed between the picture screen 15 and the auxiliary screen 4 is a transparent-mirror 2. This transparent mirror in Figs. 1 and 2 transmits the picture of the colored translucent screen 4 to the eye 13 and reflects a mirror-picture of screen 15 to the eye. In the drawings the transparent-mirror 2 is inclined at 45° angle and the two screens 4 and 15 are at a 90° angle and are equally distant from the transparent mirror. In this position the eye will see the reflected picture at the same place, where the auxiliary screen is located and the two light impressions will appear as one. Any other convenient position of the transparent mirror and the screens may be used. In Fig. 3 screen 15 is made to face the viewer and its light is transmitted while the light coming from screen 4 is reflected. The result will be the same. Instead of lights 5, 6 and 7, one constant light-source may be used and small filters in the desired colors may revolve in front of it. This also would illuminate screen 4 in the desired colors and is an alternate construction.

In the operation of the method, a picture in shades of one color (black and white) is formed on screen 15. One of the lights 5, 6 or 7 is energized and illuminates screen 4 uniformly in its color. By repeating this process for the three primary colors fast enough to come within the time-limit of the persistence of vision of the eye one picture will be perceived in natural colors.

I claim:

1. In a color picture system: a plurality of light sources for producing different colors; means forming by aid of said sources a regular succession of substantially uniform color fields in repeated cycle and corresponding to said colors; means producing a succession of picture fields in which the intensities of the component areas correspond to the desired intensity of color components corresponding to said colors; and a mirror having light transmitting and light reflecting properties; said mirror being so placed relative to the color fields and the picture fields that these fields appear superimposed, one of the superimposed fields being reflected from the mirror and the other of the superimposed fields being viewed through the mirror.

2. In a television receiver: a cathode ray tube having a picture screen for forming on the screen a picture field in which the component areas of the fields may have intensities corresponding in regular succession to desired color intensities of a plurality of different color components; a plurality of colored light sources corresponding to said different colors; means forming by aid of said sources, a regular succession of substantially uniform color fields in repeated cycles and corresponding to said colors; and a mirror having light transmitting and light reflecting properties; said mirror being so placed relative to the color fields and the picture fields that these fields appear superimposed, one of the superimposed fields being reflected from the mirror, and the other of the superimposed fields being viewed through the mirror.

3. In a color picture system: means forming a regular succession of substantially uniform fields of different colors in repeated cycles; means producing a succesison of picture fields in which the intensities of the component areas correspond to the desired intensity of color components corresponding to said colors; and a mirror having light transmitting and light reflecting properties; said mirror being so placed relative to the color fields and the picture fields that these fields appear superimposed, one of the superimposed fields being reflected from the mirror and the other of the superimposed fields being viewed through the mirror.

PETER SCHWARZ.

REFERENCES CITED

The following references are of record in the file of this patent:

UNITED STATES PATENTS

| Number | Name | Date |
|---|---|---|
| 2,061,378 | Henze et al. | Nov. 17, 1936 |
| 2,191,515 | Bronk | Feb. 27, 1940 |
| 2,251,984 | Cleaver et al. | Aug. 12, 1941 |
| 2,295,628 | Biedermann | Sept. 15, 1942 |
| 2,335,180 | Goldsmith | Nov. 23, 1943 |
| 2,343,971 | Goldsmith | Mar. 14, 1944 |
| 2,406,451 | Barkenstein | Aug. 27, 1946 |